Figure 1:
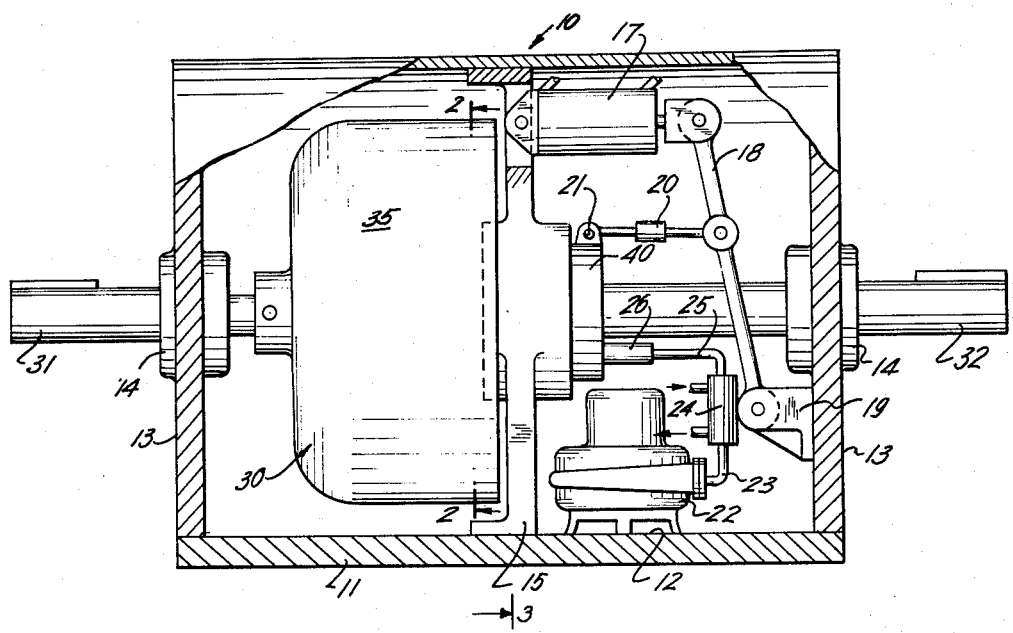

Nov. 17, 1964 R. C. SMITH 3,157,031
FLUID TRANSMISSION COUPLINGS
Filed Dec. 18, 1962 2 Sheets-Sheet 1

INVENTOR.
RALPH C. SMITH
BY Charles J. Worth
AGENT

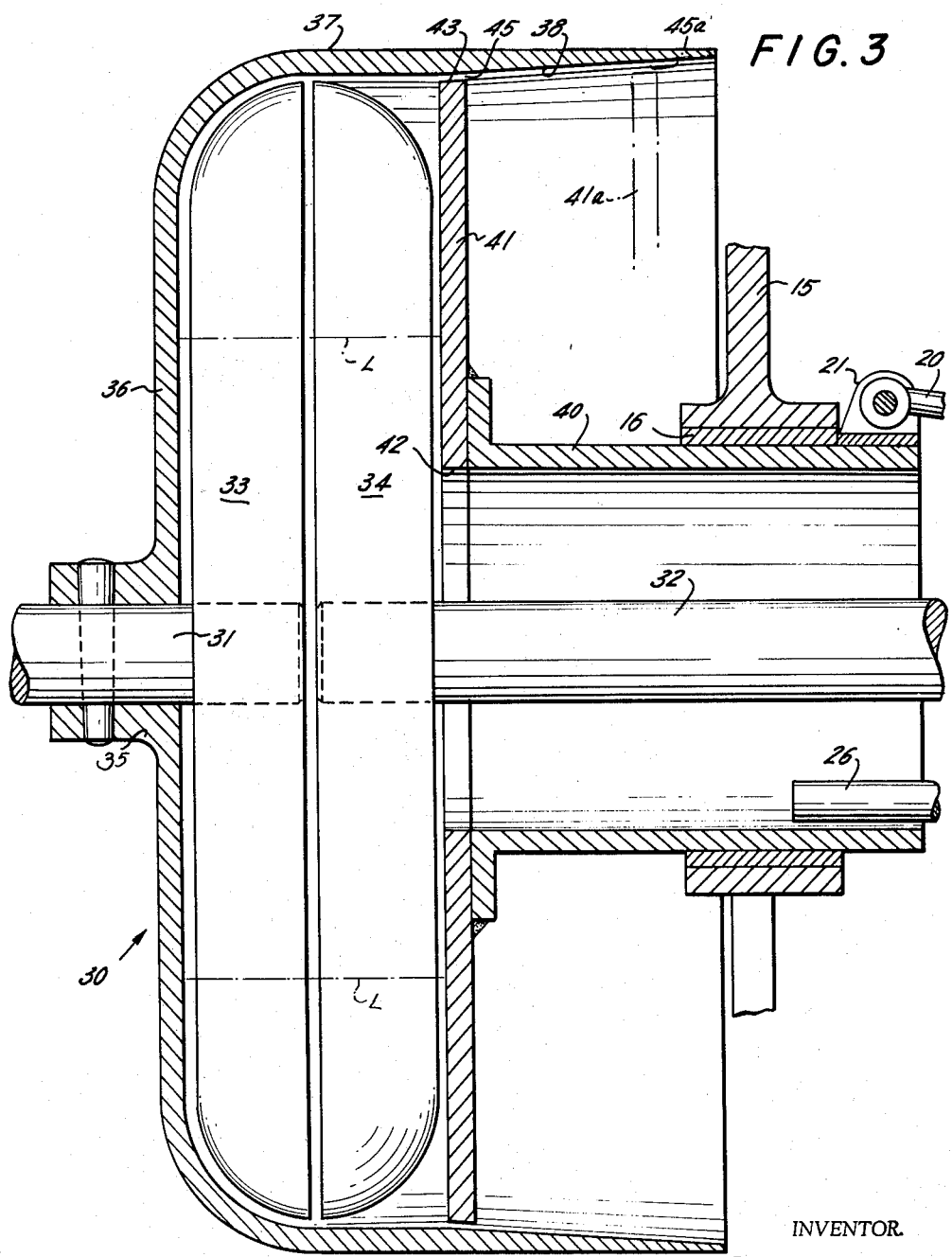

ated Nov. 17, 1964

United States Patent Office
3,157,031
Patented Nov. 17, 1964

3,157,031
FLUID TRANSMISSION COUPLINGS
Ralph C. Smith, New York, N.Y., assignor to Ingersoll-Rand Company, New York, N.Y., a corporation of New Jersey
Filed Dec. 18, 1962, Ser. No. 245,482
6 Claims. (Cl. 60—54)

This invention relates generally to power transmitting devices and particularly to fluid turbine type couplings with means for varying the coupling output-input ratio.

At the present time there are various arrangements of such fluid couplings, however, operation thereof depends solely upon varying the total fluid volume of the coupling case or bell. Illustrative devices of the foregoing are shown in U.S. Patents, No. 2,127,738 issued August 23, 1938 to F. Kugel; No. 2,182,049 issued December 5, 1939 to F. J. G. Henry; No. 2,707,376 issued May 3, 1955 to A. F. L. Anderson; and Nos. 2,880,583 and 2,882,683 issued April 7 and 21, respectively, 1959 to H. Sinclair. In all of these arrangements, a fluid circulation system provides coupling fluid. A similar transmission coupling utilizing a closed fluid system is shown in U.S. Patent 2,179,518 issued November 14, 1939 to I. C. Popper which has no continuous flow of inlet and outlet fluid. Various other arrangements have been proposed or used such as varying the pitch angle of turbine vanes and varying the face to face relationship of the input and output turbines, the latter being shown in U.S. Patent No. 2,385,058 issued September 18, 1955 to H. Buthe.

Of primary concern in the present application is the type of fluid coupling connected in a circulatory system wherein heated fluid discharged from the coupling may be passed through cooling means prior to delivery back into the coupling. As is well known, differential movement or rotation between a driving impeller rotor and a driven turbine rotor creates a substantially amount of heat which is normally absorbed and carried off by circulating fluid of a coupling. It should be readily realized that in the aforementioned patents directed to couplings with fluid circulatory systems, a relatively large pump is required to replace discharged fluid, after the fluid level in the coupling was lowered, to regain a maximum fluid content for high transmission output.

In view of the foregoing, an object of this invention is to provide a fluid turbine type coupling for power transmission having means for varying the power output-input ratio.

Another object of this invention is to provide the aforementioned coupling wherein the coupling output varies proportionally to the change of the fluid level.

And another object of this invention is to provide the aforementioned coupling wherein the fluid level is only partially varied by controlling fluid flow through the coupling.

Still another object of this invention is to provide a fluid turbine type coupling with improved resistance characteristics to overheating and having means for varying the output by varying the liquid level thereof.

This invention contemplates a turbine type transmission coupling comprising a casing having an annular wall and a pair of spaced end walls defining a turbine chamber; the chamber having an inlet adopted to receive flow of fluid to provide a transmission medium of annular form during coupling operation due to centrifugal force. A pair of bladed rotors are disposed in face to face relationship in the chamber, one connected to a power input for driving the transmission medium or fluid which, in turn, drives the other rotor. One of the end walls is fixed to the annular wall while the other end wall is disposed within the annular wall and is spaced therefrom to form a fluid outlet for the chamber, and is movable axially relative to the fixed end wall to vary the axial width of the chamber to vary the fluid level of the fluid or its depth measured radially from the axis of rotation.

The foregoing and other objects and advantages of the invention will appear more fully hereinafter from a consideration of the detailed description which follows, taken together with the accompanying drawings wherein one embodiment of the invention is illustrated by way of example. It is to be expressly understood, however, that the drawings are for illustration purposes only and are not to be construed as defining the limits of the invention.

Figure 2:
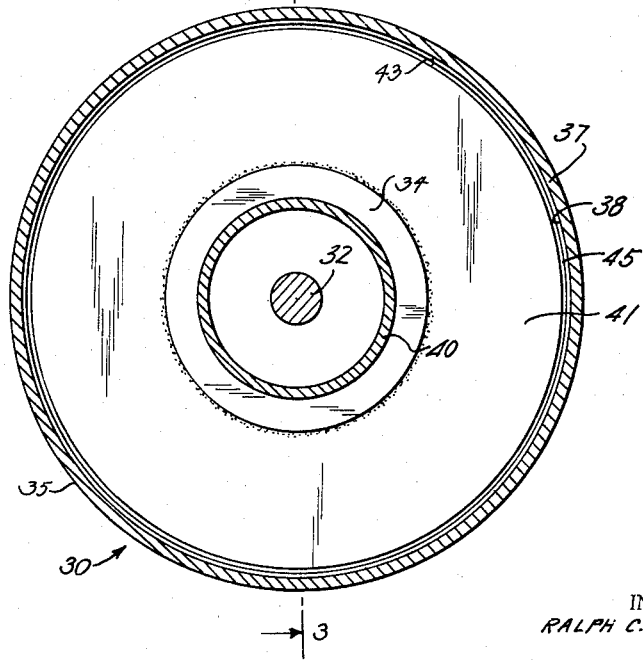

FIGURE 1 is a sectional view of a coupling housing with the coupling shown in elevation therein, FIGURE 2 is an enlarged sectional view taken on line 2—2 of FIGURE 1, and FIGURE 3 is a further enlarged sectional view taken on line 3—3 of FIGURE 2.

Referring now to the drawings, and specifically to FIGURE 1, an outer coupling housing or case 10 has a base 11 with a depressed portion of its surface forming a sump area 12 spaced from the base edges. A pair of spaced end walls 13 are connected to base 11 of housing 10 and have sealed bearings 14 for supporting a drive shaft 31 and a driven shaft 32 of a fluid coupling 30 rotatable on a common axis. Spaced between the end walls 13 is a spider type support 15 which slidably supports a flanged tube or collar 40 of the fluid coupling 30, which will be further discussed.

A double acting axial motor 17 (shown as a fluid motor or cylinder) is pivotably connected at one end to support 15 and is provided for varying the fluid level in coupling 30. A bracket 19 is fixed to one of the end walls 13 and pivotably mounts one end of an arm 18 which is connected to the fluid motor 17 at its other end. An adjustable tie rod or turnbuckle member 20 is pivotally connected to an intermediate point of arm 18 at one end and to a bracket 21 at its other end. Use of an adjustable member 20 permits setting the controls for proper operation. Bracket 21 is fixed to flanged tube 40. Thus, expanding or contracting motor 17 pivots arm 18 on bracket 19 and, through turnbuckle 20, axially moves the flanged tube 40 along the driven shaft 32.

A motor and pump 22, supported on base 11, receives fluid from the sump area 12 and discharges fluid through its discharge connection 23 to an intercooler 24. Intercooler 24, in turn, provides fluid to coupling 30 through its discharge 25 and a coupling feed tube 26. The aforementioned provides a control system for varying the output-input ratio, and the major portion of a fluid circulatory system including fluid cooling means for coupling 30, these are merely illustrative arrangements and are not to be construed as defining limits of the invention.

Coupling 30 is shown in detail in FIGURES 2 and 3 wherein a pair of bladed rotors 33 and 34 are disposed in face to face relationship in a coupling bell or bowl 35 which forms the inner coupling housing. Rotor 33 is fixed on the end of drive shaft 31 thus driving fluid in coupling 30 in a circular path or annulus to react on and drive driven rotor 34 fixed on the end of driven shaft 32. Bell 35 has an end wall 36 with a flanged central opening for shaft 31 and is preferably connected to such shaft, as shown. End wall 36 has a peripheral flange 37 which forms the annular wall of coupling 30, and extends a substantial distance past the driven rotor 34. Annular wall 37 has a flared inner valving surface 38 providing an opening at the end of wall 37 that gradually diminishes to its minimum adjacent the outer end of driven rotor 34. It should be understood that surface 38 could be stepped instead of being flared, or the wall 37, itself, could be shaped to provide the required valve surface 38.

As previously stated, flanged tube 40 is slidably supported by spider 15 and has the tie rod bracket 21 fixed to its outer end. Preferably, spider 15 has a bushing type bearing 16 to reduce friction as tube 40 is moved axially. The flange of tube 40 is disposed at its inner or coupling end remote from bracket 21 and supports a plate 41 which forms an adjustable end wall of coupling 30 that is connected to the flange by welding, bolts, rivets, or any other conventional means. The adjustable coupling wall 41 has a central opening 42 providing a surface flush with the inner surface of tube 40 and an outer peripheral valving surface 43 which cooperates with the inner surface 38 of annular wall 37 to provide an annular valved fluid discharge opening 45. Preferably, valve surface 43 has the same angular disposition as the flared valve surface 38, with which it cooperates, to provide an annular valve opening 45 which is constant from the inside to the outside surface of plate 41.

As indicated in FIGURE 3, as plate 41 is moved by motor 17, through arm 18, turnbuckle 21, and tube 40, outwardly from rotors 43 and 44 (to the right with respect to the drawings) to its maximum displaced position 41a, the formed annular valve opening or discharge 45a progressively increases. Thus, it should be readily understood, that movement of plate 41 not only increases the size of the valved opening 45 but also increases the axial length of the rotor chamber of coupling 30 which is defined by the bell 35 and the adjustable wall 41. The level L of the fluid in the coupling 30 effects the rate of flow through discharge 45. Thus, the discharge 45 may be designed to gradually increase in size to maintain a constant flow rate as the fluid level L decreases, or to vary inversely with the change of the fluid level L. With the first arrangement, only the level of the fluid varies, not the fluid volume in coupling 30. However, with the second arrangement, the fluid level L varies because of simultaneous change of the axial chamber width and the discharge rate.

It should be understood that while bell 35 rotates with shaft 31 and is fixed against axial movement with wall 41 being movable axially and fixed against rotation, this is merely a preferred arrangement. These members may both be held against rotation, or may be rotated in unison as modified arrangements. A further modification within the scope of the present invention is to hold wall 41 against axial movement while bell 35 is moved to vary the volume of the coupling chamber.

In operation, means (not shown) drives shaft 31 which spins or rotates rotor 33 and bell 35, in unison, driving the fluid in the bell 35 in a circular path forming a ring or annulus at a level L against the inner surfaces of the walls of coupling 30 which define the rotor chamber. Centrifugal force derived from the circular fluid flow tends to urge fluid out the valved annular discharge opening 45 between valve surfaces 38 and 43. Flow forces of the fluid act on and rotate or spin rotor 33 which is fixed on the end of and rotates in unison with driven shaft 32 to provide desired coupling output.

To maintain the fluid level L, the motor and pump combination 22 pumps fluid from the sump area 12 at the base 11 of the outer housing 10 through its discharge 23 to the cooler 24. The cooled fluid is discharged from cooler 24 through its outlet 25 and the coupling feed tube 26 to the inside of the flanged tube 40. With coupling 30 in its maximum output condition as shown in FIGURE 3, flow from tube 25 is sufficient to maintain the fluid level L, or preferably provide inlet fluid in excess of fluid being discharged through the annular valved outlet 45. Thus, the fluid in coupling 30 is provided as the force transmission medium whose capabilities are determined by its radial depth defined by its relative level L.

When drive shaft 31 is rotated by constant speed means (not shown), other means is required to vary the output of coupling 30 which is the rotation of driven shaft 32, measured as output speed or torque. To obtain a variable output, the effect of the driving medium must be altered. This can be accomplished in various ways as heretofore discussed. However, the present invention is concerned with varying the fluid level to derive variable output. In its maximum output condition, walls 36 and 41 are in very close spaced relationship with rotors 33 and 34, respectively, and define therebetween the width of the rotor chamber, measured axially.

To reduce the output of coupling 30, motor 17 is expanded which rotates arm 18 (clockwise in FIGURE 1) on its bracket 19. Pivotation of arm 18 moves flanged tube 40 and wall 41 axially away from wall 36 (toward the right in FIGURES 1 and 3) which simultaneously provides two means of lowering the liquid level L in the rotor chamber. First, movement of wall 41 enlarges the width of the rotor chamber such that the liquid volume therein urged radially outwardly by centrifugal force cannot maintain its level L due to the increased peripheral chamber area. Further, as valve surface 43 of plate 41 moves axially relative to the annular wall 37 of bell 35, surface 43 is progressively positioned relative to a portion of surface 38 which is a greater distance from the center of rotation of coupling 30 to provide progressively larger annular discharge opening 45a having an increased flow capacity.

It should be realized that by widening the rotor chamber to reduce the fluid level L, the variation of the discharge flow can be small while obtaining relatively large changes of the coupling output. Therefore, a pump, smaller than would be normally required, would have sufficient capacity for fluid circulation. The novel fluid coupling 30 is attended by still another advantage, that being its resistance to overheating. It is well known that the severity of heating increases with slippage between the driving and driven rotors, or when the difference between the input and output increases. In fluid couplings prior to the present invention, only the fluid volume in the coupling was varied to vary the fluid level. The energy difference between input and output creates heat which is carried off by the circulating fluid, such fluid volume in each coupling being progressively decreasing under increasingly severe heating conditions. In coupling 30 made in accordance with the present invention, the temperature variations of the fluid is held to a minimum by the relatively constant fluid volume in the rotor chamber.

Although but a single embodiment of the invention has been illustrated and described in detail, it is to be expressly understood that the invention is not limited thereto. Various changes may also be made in the design and arrangement of parts without departing from the spirit and scope of the invention as will now be understood by those skilled in the art.

I claim:
1. A transmission coupling having a variable output-input ratio, comprising:
   (a) a housing with an annular wall and a pair of end walls defining a chamber;
   (b) a pair of shafts rotatable on a common axis extending into the chamber, one being rotated to provide coupling input and the other to provide coupling output when rotated;
   (c) a pair of bladed rotors disposed in spaced face to face relationship in the chamber, one being connected to the input shaft to drive fluid in a circular path in the chamber, and the other being connected to the output shaft and driven by such fluid;
   (d) said housing having an inlet to receive fluid as a driving medium which forms an annulus adjacent the annular wall and is retained by the end walls when the coupling is in operation, and a discharge for such fluid; and
   (e) at least one of the end walls being movable axial- ly relative to the other to vary the width of the chamber for varying the level of driven fluid to vary the output-input ratio of the coupling.

2. A transmission coupling having a variable output-input ratio, comprising:
   (a) a housing with an annular wall and a pair of end walls defining a chamber;
   (b) a pair of shafts rotatable on a common axis extending into the chamber, one being rotated to provide coupling input and the other to provide coupling output when rotated;
   (c) a pair of bladed rotors disposed in spaced face to face relationship in the chamber, one being connected to the input shaft to drive fluid in a circular path in the chamber, and the other being connected to the output shaft and driven by such fluid;
   (d) said housing having an inlet to receive a constant flow of fluid as a driving medium which forms an annulus adjacent the annular wall and is retained by the end walls when the coupling is in operation, and a discharge for such fluid;
   (e) a valve for controlling flow of such fluid; and
   (f) one of the end walls being operatively associated with said valve and movable axially relative to the other end wall to adjust the valve and change the width of the chamber for varying the level of driven fluid to vary the output-input ratio of the coupling.

3. A transmission coupling having a variable output-input ratio, comprising:
   (a) a housing having an annular wall and a pair of spaced walls to define a chamber;
   (b) an input shaft and an output shaft rotatable on a common axis extending into the chamber;
   (c) a pair of bladed rotors disposed in spaced face to face relationship in the chamber, one of the rotors being connected to the input shaft for driving an annulus of fluid in a circular path and the other of the rotors being connected to the output shaft to be driven by such driven fluid;
   (d) one of the spaced walls being connected to the annular wall closing one end of the chamber;
   (e) the other of the spaced walls being disposed in the annular wall and spaced therefrom to provide an annulus outlet for fluid from the chamber, a central opening to pass fluid into the chamber as a driving medium which forms an annulus adjacent the annular wall and is retained by the spaced walls; and
   (f) said other wall being movable axially to change the width of the chamber for varying the level of the annulus to vary the output of the coupling when the input is constant.

4. The transmission coupling in accordance with claim 3, and
   (a) a tubular member encircling one of the shafts and connected at one end to the movable wall and with the movable wall forming the central opening;
   (b) and the tubular member extending past the open end of the annular wall and being adapted to be connected to means for moving the movable wall between an innermost and an outermost position.

5. The transmission coupling in accordance with claim 3, and
   (a) said annular wall having an inner surface that is flared outwardly toward the open end of the chamber to provide a progressively enlarging outlet as the movable wall moves away from the rotors to provide continuous discharge flow therethrough as the level of an annulus in the chamber becomes lower.

6. The transmission coupling in accordance with claim 3, and
   (a) said annular wall having an inner surface that is flared outwardly toward the open end of the chamber to provide a progressively enlarging outlet as the movable wall moves away from the rotors to provide increased outlet flow for reducing fluid volume simultaneously with reducing fluid level of an annulus in the chamber.

References Cited in the file of this patent

UNITED STATES PATENTS

| | | |
|---|---|---|
| 1,192,233 | Severy | July 25, 1916 |
| 1,910,697 | Kiep | May 23, 1933 |
| 2,385,263 | Ericson et al. | Sept. 18, 1945 |